(12) United States Patent
Suzuki

(10) Patent No.: US 8,128,338 B2
(45) Date of Patent: Mar. 6, 2012

(54) PROPELLER AND HORIZONTAL-AXIS WIND TURBINE

(75) Inventor: Masahiko Suzuki, Hamamatsu (JP)

(73) Assignee: Kabushiki Kaisha Bellsion (JP)

( * ) Notice: Subject to any disclaimer, the term of this patent is extended or adjusted under 35 U.S.C. 154(b) by 663 days.

(21) Appl. No.: 11/720,373

(22) PCT Filed: Nov. 11, 2005

(86) PCT No.: PCT/JP2005/020691
§ 371 (c)(1),
(2), (4) Date: May 29, 2007

(87) PCT Pub. No.: WO2006/059472
PCT Pub. Date: Jun. 8, 2006

(65) Prior Publication Data
US 2008/0093860 A1 Apr. 24, 2008

(30) Foreign Application Priority Data

Nov. 30, 2004 (JP) .................. 2004-346440
Feb. 15, 2005 (JP) .................. 2005-038277
Mar. 15, 2005 (JP) .................. 2005-072472
Jun. 30, 2005 (JP) .................. 2005-192388
Sep. 15, 2005 (JP) .................. 2005-268928

(51) Int. Cl.
*F03D 1/06* (2006.01)
*F03D 11/00* (2006.01)
(52) U.S. Cl. .......................... 415/4.3; 415/4.5
(58) Field of Classification Search .............. 415/228, 415/235, 238, 4.3, 4.5; 416/9, 242
See application file for complete search history.

(56) References Cited

U.S. PATENT DOCUMENTS

| 1,919,250 | A | * | 7/1933 | Olson ................................ 416/238 |
| 4,789,306 | A | * | 12/1988 | Vorus et al. .................. 416/223 R |
| 5,616,004 | A | * | 4/1997 | Alizadeh ......................... 416/238 |
| 6,582,196 | B1 | * | 6/2003 | Andersen et al. ............... 416/202 |
| 7,018,167 | B2 | * | 3/2006 | Yoshida .............................. 415/4.5 |
| 2003/0123988 | A1 | * | 7/2003 | Wen ................................. 416/228 |
| 2005/0233654 | A1 | * | 10/2005 | Mueller ............................ 440/49 |
| 2007/0116576 | A1 | * | 5/2007 | Chang et al. .................... 416/228 |

FOREIGN PATENT DOCUMENTS

| DE | 4030559 | 4/1992 |
| GB | 2065787 | 11/1980 |
| JP | 5736/1976 | 7/1977 |
| JP | 56-167599 | 12/1981 |
| JP | 60-119384 | 6/1985 |
| JP | 61-43276 | 3/1986 |
| JP | 64-22698 | 1/1989 |
| JP | 2004-84590 | 3/2004 |
| WO | WO 2004/ 061298 | 7/2004 |

OTHER PUBLICATIONS

International Search Report PCT/JP2005/020691 dated Feb. 2, 2006 (Japanese Patent Office).

* cited by examiner

*Primary Examiner* — Justine Yu
*Assistant Examiner* — Jesse Prager
(74) *Attorney, Agent, or Firm* — Ostrolenk Faber LLP

(57) ABSTRACT

A propeller, wherein the tip parts of the propeller blades of a horizontal-shaft windmill are tilted in the front direction of the propeller blades to form inclination parts. The inclination angle of the tilted parts is set within the range of 25 to 50° relative to the longitudinal direction of the propeller blades.

1 Claim, 10 Drawing Sheets

PROPELLER AND HORIZONTAL-AXIS WIND TURBINE

CROSS REFERENCE TO RELATED APPLICATION

The present application is a 35 U.S.C. §§ 371 national phase conversion of PCT/JP2005/020691, filed Nov. 11, 2005, which claims priority of Japanese Patent Application No. 2004-346440, filed Nov. 30, 2004, Japanese Patent Application No.2005-038277, filed Feb. 15, 2005, Japanese Patent Application No. 2005-072472, filed Mar. 15, 2005, Japanese Patent Application No. 2005-192388, filed Jun. 30, 2005, and Japanese Patent Application No. 2005-268928, filed Sep. 15, 2005, the disclosure of which are herein incorporated by reference. The PCT International Application was published in the Japanese language.

BACKGROUND OF THE INVENTION

1. Field of the Invention

The present invention relates to a propeller and to a horizontal-axis wind turbine, and particularly relates to a propeller in which a tilted part is formed so that the distal end parts of the propeller vanes of a wind turbine are tilted toward the front surfaces of the propeller vanes, and to a horizontal-axis wind turbine that uses the propeller.

2. Description of the Related Art

Horizontal-axis propeller turbines have been used in the past as wind turbines for wind power generators. Large propeller wind turbines having propeller vane lengths on the order of 10 m to 50 m are used, and propeller turbines in which the distal ends of the vanes are narrowed are in mainstream use due to rotational efficiency. The reason for this is that the rotational speed of the distal ends of long propeller vanes is naturally higher than that of the proximal ends. Accordingly, it is believed that air resistance increases, and rotational speed decreases when the chord length of the distal ends of the propeller vanes is increased. The conventional propeller also allows the wind received by the propeller to escape in the centrifugal direction, and significant loss occurs.

SUMMARY OF THE INVENTION

The rotational efficiency of a wind turbine is determined by the wind-receiving surface area of the propeller. A comparison between, for example, two groups of propeller vanes which have the same triangular shape but in which one of the groups have an increased chord length in the proximal ends, and the other group has an increased chord length in the distal ends indicates that although the wind-receiving surface area of the wind turbine is equal, the propeller vanes in which the chord length of the distal ends is increased have an increased axial torque and a reduced rotational speed.

An object of the present invention is to provide a propeller in which the wind power efficiency is increased by tilting the distal end parts of the propeller vanes toward the front surfaces to form a tilted part, and causing the wind that comes in contact with the tilted parts to be concentrated towards the center of rotation, and to provide a horizontal-axis wind turbine that uses the propeller. The specific details of the present invention are as follows.

DESCRIPTION OF THE PREFERRED EMBODIMENTS

A tilted part is formed so that the distal end part of the wind-receiving part of a propeller vane is tilted toward the front surface. The distal edge of a propeller vane is formed so as to have a large chord length to increase wind-receiving efficiency.

Embodiment 1

Figure 1:
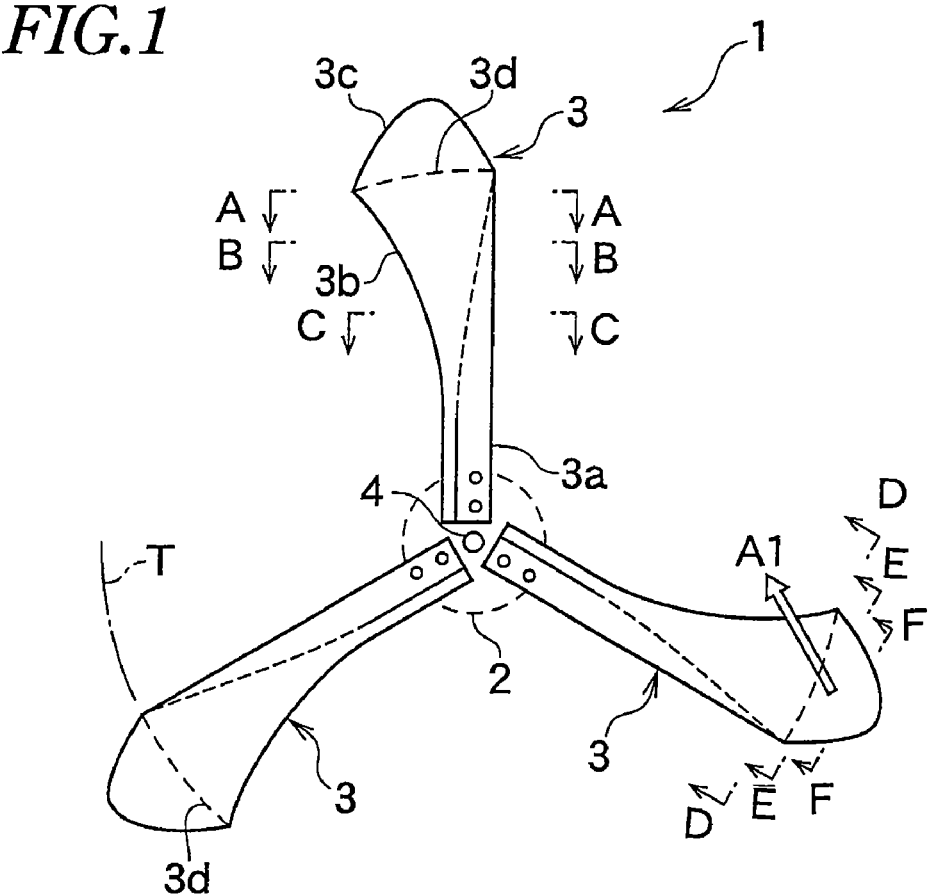
FIG. 1 is a front view showing a propeller according to Embodiment 1 of the present invention.
Figure 2:
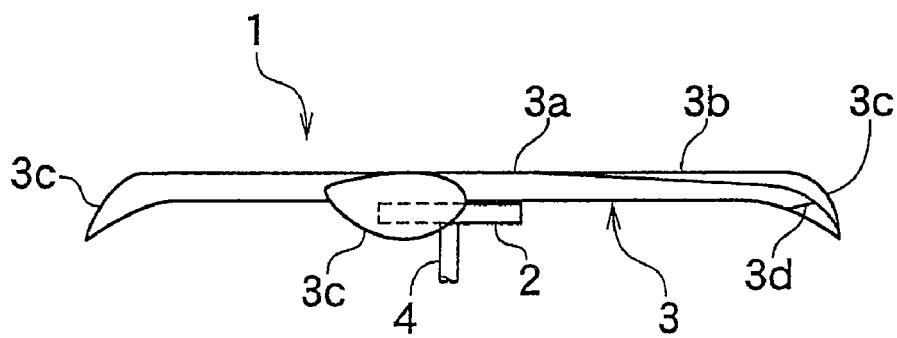
FIG. 2 is a plan view showing the propeller shown in FIG. 1.

Embodiments of the present invention will be described with reference to the drawings. FIG. 1 is a front view showing the propeller according to the present invention, and FIG. 2 is a plan view showing the propeller shown in FIG. 1. In FIG. 1, a propeller 1 is provided in which three propeller vanes 3 are disposed at equal intervals in the radial direction on the front surface of a boss 2. The reference numeral 4 indicates the propeller shaft. The boss 2 may have any shape.

The propeller vanes 3 in the drawing are designed so that the base parts 3a are fastened on the back surface of the boss 2 by bolts, but any other fixing means may be adopted, such as fastening by screws to the peripheral surface of a shaft part 2.

The propeller vanes 3 are three-dimensional, and as shown in FIG. 1, the base part 3a has a narrow rod shape in front, and the distal end part thereof is widened to form a wind-receiving part 3b. The wind-receiving part 3b is designed so as to have a large distal edge part and a large trailing region.

As shown in FIG. 2, the distal ends of the propeller vanes 3 are tilted toward the front to form tilted parts 3c. The reference numeral 3d in FIG. 1 indicates a base part boundary line that means a boundary line between the base part 3a and the tilted part 3c, and the base part boundary line 3d is an arc of a circle or a rotational track (T) formed during rotation of the propeller vanes 3.

Accordingly, the air resistance of the proximal end portions of the tilted parts 3c decreases during rotation of the propeller vanes 3.

The length of the tilted parts 3c is about 5% to 20% of the length of the propeller vanes, for example, and the tilt angle thereof is in the range of 15 degrees to 50 degrees at the center, preferably 40 degrees to 45 degrees, with respect to the straight portion of the propeller vanes 3. The maximum chord length of the wind-receiving parts 3b is set to approximately 14% of the rotational diameter of the propeller vanes 3, and can be set within a range of 13% to 25%.

Figure 3:
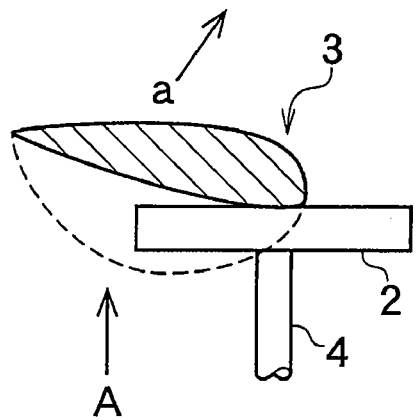
FIG. 3 is a sectional view taken along the line A-A in FIG. 1.
Figure 4:
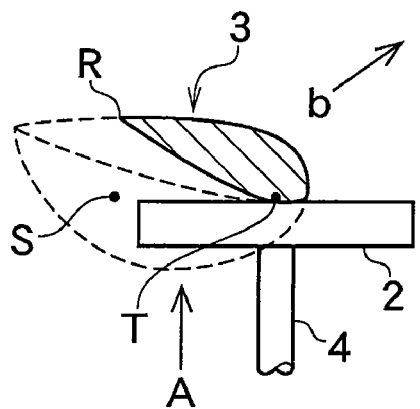
FIG. 4 is a sectional view taken along the line B-B in FIG. 1.
Figure 5:
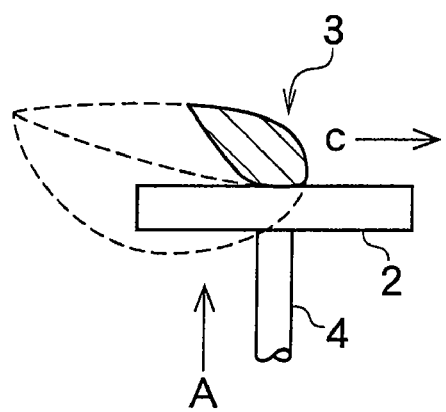
FIG. 5 is a sectional view taken along the line C-C in FIG. 1.

FIG. 3 is a sectional view taken along the line A-A in FIG. 1; FIG. 4 is a sectional view taken along the line B-B in FIG. 1; and FIG. 5 is a sectional view taken along the line C-C in FIG. 1.

The wind-receiving parts 3b are designed so that the front surfaces of the wind-receiving parts 3b have a gradual tilt with respect to the rotational direction of the boss 2, and the tilt progresses from the base parts 3a of the propeller vanes 3 to the distal end parts.

In this configuration, the closer the trailing end regions (left part in the drawings) of the wind-receiving parts 3b are to the front to the distal end regions of the propeller vanes 3, the more these trailing end regions are displaced in the direction of the front surface.

Figure 6:
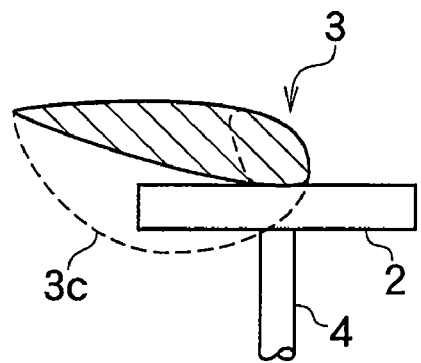
FIG. 6 is a sectional view taken along the line D-D in FIG. 1.
Figure 7:
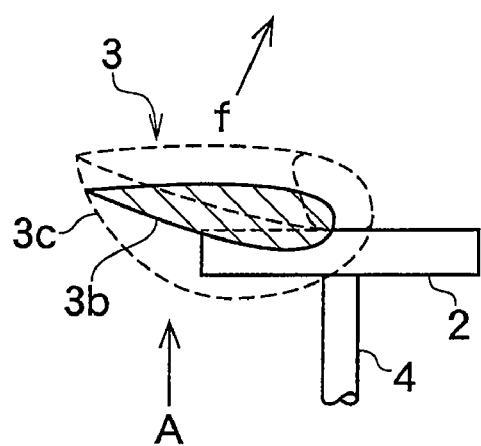
FIG. 7 is a sectional view taken along the line E-E in FIG. 1.
Figure 8:
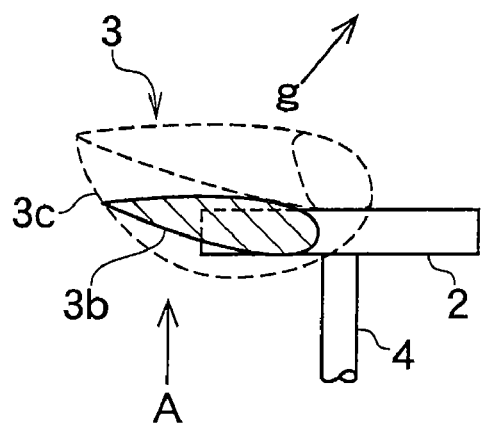
FIG. 8 is a sectional view taken along the line F-F in FIG. 1.

FIG. 6 is a sectional view taken along the line D-D of the tilted parts 3c in FIG. 1; FIG. 7 is a sectional view taken along the line E-E in FIG. 1; and FIG. 8 is a sectional view taken along the line F-F in FIG. 1. The closer the vanes are to the distal end parts of the tilted parts 3c, the more the vanes protrude towards the front, and the farther the front surfaces are from the leading edges (to the right in the drawings) toward the trailing edges (to the left in the drawings), the more these surfaces are tilted toward the back.

In FIGS. 1 and 2, when wind is applied from the frontal direction, the surface area contacted by wind is wide in the portion taken along the line A-A, and wind indicated by the arrow A flows to the left along the front surfaces of the propeller vanes 3 and creates pressure on the propeller vanes 3 in the direction of the arrow a, as shown in FIG. 3.

In the portion along line B-B, the surface area contacted by the wind is smaller than in the portion along line A-A, and since the wind indicated by the arrow A flows to the left along the front surfaces of the propeller vanes 3, and the front surfaces have a large rearward tilt angle, the wind passes through quickly and creates pressure on the propeller vanes 3 in the direction of the arrow b, as shown in FIG. 4.

In the portion along line C-C, the surface area contacted by the wind is smaller than in the portion along line B-B, and since the wind indicated by the arrow A flows to the left along the front surfaces of the propeller vanes 3, and the front surfaces have a large rearward tilt angle, the wind passes through quickly and creates pressure on the propeller vanes 3 in the direction of the arrow c, as shown in FIG. 5. The base parts 3a encounter wind resistance, but do not impede the rotation of the propeller vanes 3, due to the small surface area of the base parts 3a.

Figure 9:
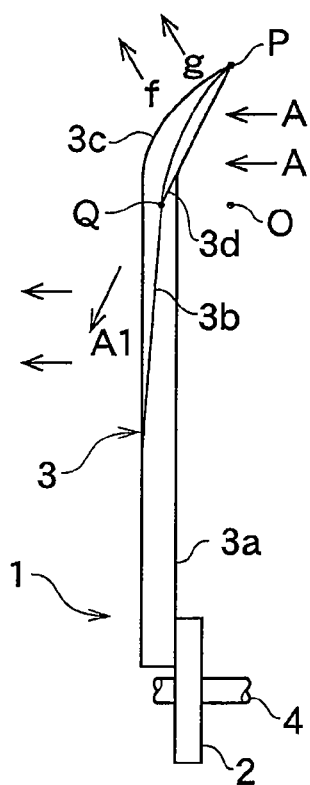
FIG. 9 is a left-side view showing one of the propeller vanes shown in FIG. 1.

In FIG. 9, wind that contacts the tilted surface between points P and Q is deflected towards point Q. The time taken for wind to pass from point O to point Q is the same as the time taken for wind to pass from point P to point Q, and the speed of the wind passing from point P to point Q is therefore higher than that of the wind passing from point O to point Q.

Therefore, in FIG. 9, the wind contacting the front tilted surfaces of the tilted parts 3c passes at high speed towards the base part boundry line 3d at an angle, merges with the wind flowing back to the left over the front surfaces of the wind-receiving parts 3b shown in FIGS. 4 and 5, increases the air density and wind pressure, and passes behind the propeller vanes 3.

Specifically, although the resistance loss due to wind stagnation in the tilted parts 3c appears large in FIG. 1, the wind contacting the tilted parts 3c passes at high speed as indicated by the arrow A1 in FIG. 1. Therefore, not only is there no wind resistance at the tilted parts 3c, but the wind around the base parts 3a of the propeller vanes 3 from line B-B in FIG. 1 is induced to pass through at high speed.

Negative pressure occurs at the front surfaces of the tilted parts 3c as the wind speed at the front surfaces increases. As a result, wind-concentrating effects occur whereby wind at normal pressure from other parts is additionally concentrated at the front surfaces of the tilted parts 3c, and more wind contacts the tilted parts 3c than other regions at the same wind speed and in the same time.

When the base part is wide in the conventional propeller vane, the flow of wind is restricted when the propeller vane rotates, a load is placed on the propeller vane, and the rotational efficiency is adversely affected by the flow of wind toward the narrow distal end of the propeller vane.

By contrast, there are good airflow properties around the base parts 3a of the propeller vanes 3 in the present invention, the centrifugal parts are wide, air is collected by the tilted parts 3c, and the wind is directed at high speed towards the wind-receiving parts 3b. Therefore, excellent wind recovery properties are ensured and a large amount of wind force is obtained at the centrifugal parts of the propeller vanes 3. The axial torque is therefore increased through a lever principle.

As a result, the efficiency of the wind turbine is increased without lengthening the vanes, and advantages are gained with respect to rigidity of the propeller vanes 3, height of the wind turbine, and other factors. As is apparent from FIG. 2, the propeller vanes 3 are shaped so that the opposing surface area in the direction of rotation is small, and the transverse cross-section creates lift. Therefore, rotational lift occurs when the propeller 1 begins to rotate.

In this case, as previously mentioned, the air density decreases, and negative pressure occurs when the wind speed from point P to point Q is greater than the wind speed between point O and point Q at the front surfaces of the tilted parts 3c in FIG. 9. Wind at normal pressure from other parts therefore rapidly moves to the front surfaces of the tilted parts 3c, thus creating the same effect as contact with wind at a higher speed than in the other parts, and the air density per unit time increases. There is therefore an increase in the total wind pressure that is pushing the propeller vanes 3 in the direction of rotation.

Specifically, although the tilted parts 3c appear to be causing the wind to stagnate, the wind speed actually increases so that the wind passes rapidly, and a correspondingly greater amount of wind comes in contact with the tilted parts 3c than with other parts. High wind-receiving efficiency is therefore obtained. In this regard, a longer distance is preferred since the wind speed is higher than that of the wind passing from point O to point Q when points P and Q are farther apart than point O and Q. However, since the wind is dissipated when merely a gradual tilt angle and a long distance are used, the optimal tilt angle is within 45 degrees.

In FIG. 1, the passing of wind in contact with the front surfaces of the tilted parts 3c backward at high speed around the proximal end parts of the tilted parts 3c helps the wind to rotate the propeller vanes 3 in the direction of rotation.

Specifically, in FIG. 4, the speed of the wind passing along from point T to point R is greater than that of the wind passing from point S to point R. Consequently, the wind pressure against the front surfaces of the tilted parts 3c pushes the propeller vanes 3 in the direction of rotation.

When the rotational speed of the conventional propeller is compared to that of the propeller 1 of the present invention in which the tilted parts 3c are formed at the distal end parts of the propeller vanes 3 in this manner, a significant difference in rotational speed is apparent, i.e., the conventional propeller has a rotational speed of 210 rpm, whereas the propeller of the present embodiment has a rotational speed of 405 rpm.

Embodiment 2

Figure 10:
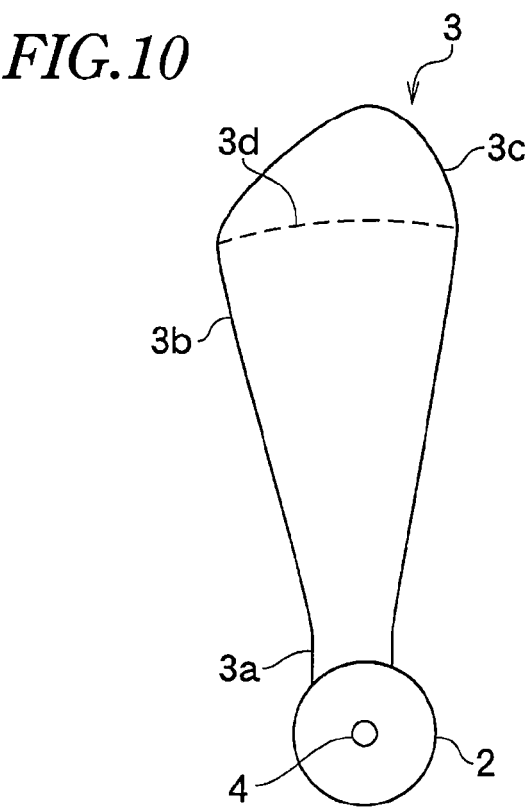
FIG. 10 is a front view showing the propeller according to Embodiment 2 of the present invention.

FIG. 10 is a front view showing Embodiment 2 of a propeller vane 3. The same numerals are used to indicate parts that are the same as those previously described, and no further description of such parts will be given.

The maximum width of wind-receiving part 3b in Embodiment 2 is set to 20% of the diameter of the propeller, but the maximum width may be increased to 25% of the propeller diameter. The width of the front surface of base part 3a is set so as to be equal to or less than ⅓ of the maximum width. The transverse cross-section of the wind-receiving part 3b is substantially the same as in Embodiment 1.

Embodiment 3

Figure 11:
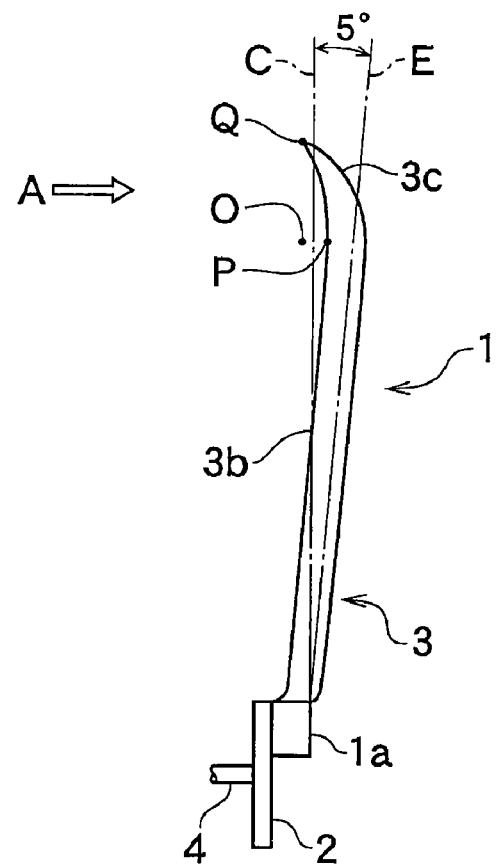
FIG. 11 is a side view showing the propeller according to Embodiment 3 of the present invention.
Figure 12:
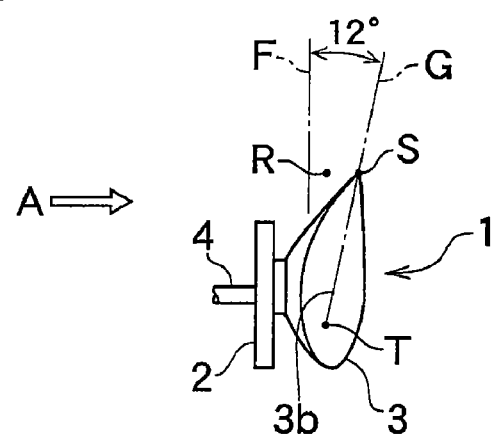
FIG. 12 is a plan view showing the propeller shown in FIG. 11.

FIG. 11 is a side view showing Embodiment 3 of a propeller vane 3; and FIG. 12 is a plan view of the same. The same numerals are used to indicate parts that are the same as those previously described, and no further description of such parts will be given.

This propeller vane 3 is designed so that the chord length of the distal end part is large, and the base part is narrow. The width of the base part is preferably in the range of 26% to 40% of the maximum chord length. The base part 3a of the propeller vane 3 is narrow, and excellent airflow withdrawal properties about the axis during rotation are therefore obtained.

In FIG. 11, the fixed part 1a of the propeller vane 3 is fixed at a right angle to a propeller shaft 4. The distal end part of the longitudinal center line (E) of the propeller 1 is tilted 4 degrees to 6 degrees to the rear in relation to the vertical longitudinal center line (C) that is perpendicular to the back surface of the fixed part 1a. This tilted surface causes the wind reaching the front surface of wind-receiving part 3b to accelerate toward the distal end of the propeller vane 3.

In FIG. 11, tilted part 3c of the propeller vane 3 is designed so that the center part thereof is tilted 25 degrees to 45 degrees forward with respect to the aforementioned longitudinal center line (E). This tilt increases the wind-receiving surface area of the tilted part 3c to approximately 1.4 times the surface area of the vertical surface. The amount of acceleration along the tilted surface is small when the tilt angle is 25 degrees or less. When the tilt angle exceeds 45 degrees, the amount of acceleration again decreases, since the flow is nearly direct.

In FIG. 12, the front surface is set to a negative angle of attack (G) of 6 degrees to 15 degrees with respect to a reference line (F) that is parallel to the back surface of fixed part 1a at the edge of the distal edge of the wind-receiving part 3b. Specifically, the wind pressure that accompanies the rotation of the propeller 1 is not directly exerted at the negative angle of attack (G), and the wind reaching the rotating propeller vane 3 does not directly act at the negative angle of attack (G), but instead passes around and to the rear along the negative angle of attack (G).

In FIG. 11, since the front surface of the wind-receiving part 3b as a whole is tilted backward, wind travels from the proximal end part towards point P in the drawing when the wind is received by the front surface of the propeller 1. The reason for this is that the wind travels in the direction of least resistance.

In the wind that is indicated by the arrow A and contacts the tilted part 3c in FIG. 11, the time taken for the wind to reach point P from point O is the same as the time taken for the air to flow from point Q to point P, and the speed of the air flowing from point Q to point P is therefore greater than the speed of the wind reaching point P from point O. The air density decreases as the speed increases, and a negative pressure occurs with respect to the surrounding air. The surrounding air at normal pressure rapidly flows in when a negative pressure occurs.

For this reason, an effect occurs at the tilted surface at the front of the tilted part 3c whereby a larger amount of wind than at other parts is locally attracted within the same time period. Specifically, wind that contacts the front surface of the wind-receiving part 3b of the propeller vane 3 under the same conditions is locally concentrated by the three-dimensional shape of the propeller vane 3, and since a strong wind force acts on the portion at point P in FIG. 11, the rotational efficiency of the propeller 1 increases.

As shown in FIG. 12, the time taken for the wind to reach point S from point R is the same as the time taken for the air to flow from point T to point S, and the speed of the air flowing from point T to point S is therefore greater than the speed of the wind reaching point S from point R. As a result, the air that flows sideways and comes into contact with the wind-receiving part 3b is faster than the wind that leaves the surrounding area and comes into contact with the wind-receiving part 3b of the propeller vane 3, and a large amount of wind is therefore attracted to the front surface of the wind-receiving part 3b.

As a result, even when the speed of the wind indicated by the arrow A is less than 4 m/s, the wind is accelerated upon contact with the propeller 1. In particular, the tilted part 3c has a wide shape in which the chord length is 26% to 40% of the rotational diameter of the propeller 1. Therefore, a large amount of wind is contacted in a set period of time, a large amount of axial torque is produced according to the lever principle.

This propeller 1 thus has the effect of locally concentrating a large amount of wind due to the formation of the tilted part 3c at the distal end part of the propeller vane 3.

By widening the propeller vane 3 so that the chord length of the distal end thereof is 26% to 40% of the rotational diameter, the area where wind is concentrated has a greater surface area than other parts, and the wind contacts the centrifugal part of the rotation of the propeller 1. Therefore, effects are obtained whereby the lever principle can be effectively utilized, and a large axial torque can be obtained even from a weak wind. The front surface of the wind-receiving part 3b is also at a negative angle of attack (G) towards the distal end part with respect to the base part 3a of the propeller vane 3, whereby wind-concentrating effects are obtained in which the wind contacting the wind-receiving part 3b is accelerated so as to pass to the rear of rotation.

Furthermore, applying an overall tilt towards the rear from the base part of the propeller vane 3 to the distal end part makes it possible to accelerate and concentrate the wind contacting the wind-receiving part 3b towards the distal end and increase the rotation force at the centrifugal part of the propeller 1.

Figure 13:
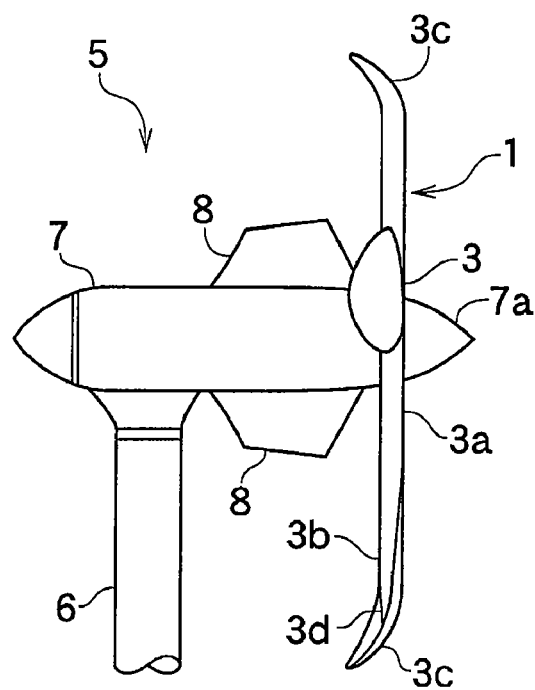
FIG. 13 is a side view showing a horizontal-axis wind turbine according to the present invention.

FIG. 13 is a right-side view showing Embodiment 2 of the horizontal-axis wind turbine 5 in which the propeller I is assembled into the wind turbine, wherein the left side of the drawing is the front.

Figure 14:
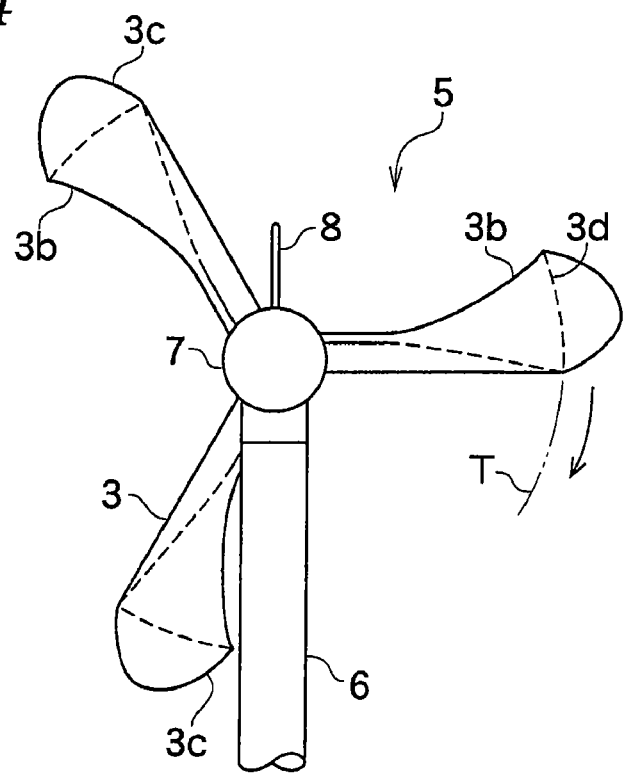
FIG. 14 is a front view showing the horizontal-axis wind turbine shown in FIG. 13.

FIG. 14 is a front view showing the horizontal-axis wind turbine. The same numerals are used to indicate parts that are the same as those previously described, and no further description of such parts will be given.

In the horizontal-axis wind turbine 5, a chassis 7 is mounted so as to be able to pivot at the top of a column 6.

The chassis 7 is designed so that the part to the rear of the pivot point of the column 6 is longer than the part in front of the pivot point. Directional rudders 8 are also vertically mounted to the top and bottom of the rear part of the chassis 7.

A horizontal shaft (propeller shaft) not shown in the drawing is horizontally supported by a bearing inside the chassis 7. The propeller 1 is fixed to the rear end part of the horizontal shaft. The reference numeral 7 indicates a rear cover.

A wind power generator can be created inside the chassis 7 by connecting a generator to the distal end part of the horizontal shaft (not shown) and providing a transmission, a brake, a clutch, an automatic control device, a speed sensor, a wind speed meter, and other components in between the horizontal shaft and the generator.

The tilted part 3c of the propeller vane 3 receives a large amount of wind when the propeller 1 is caused to rotate by the wind. Therefore, the position of the propeller 1 is corrected with high sensitivity when the wind direction changes, and the propeller 1 is always positioned downwind. The directional rudders 8 provide a rapid response to the wind direction when there is a transverse wind.

The propeller vane 3 is placed behind the column 6 temporarily during rotation when the propeller 1 is positioned downwind of the chassis 7. However, as shown in FIG. 14, the wide tilted part 3c at the centrifugal part of the propeller vane 3 is at the centrifugal part during rotation, and therefore has a higher rotational speed than the base part 3a, and is behind the column 6 only for a short time.

Since the propeller 1 is separated from the column 6, the wind that flows around the column 6 contacts the wide wind-receiving part 3b and tilted part 3c. Therefore, there is no adverse effect on the rotational efficiency, and the high rotational efficiency created by the ability to respond with high sensitivity to changes in wind direction has a compensating effect.

Figure 15:
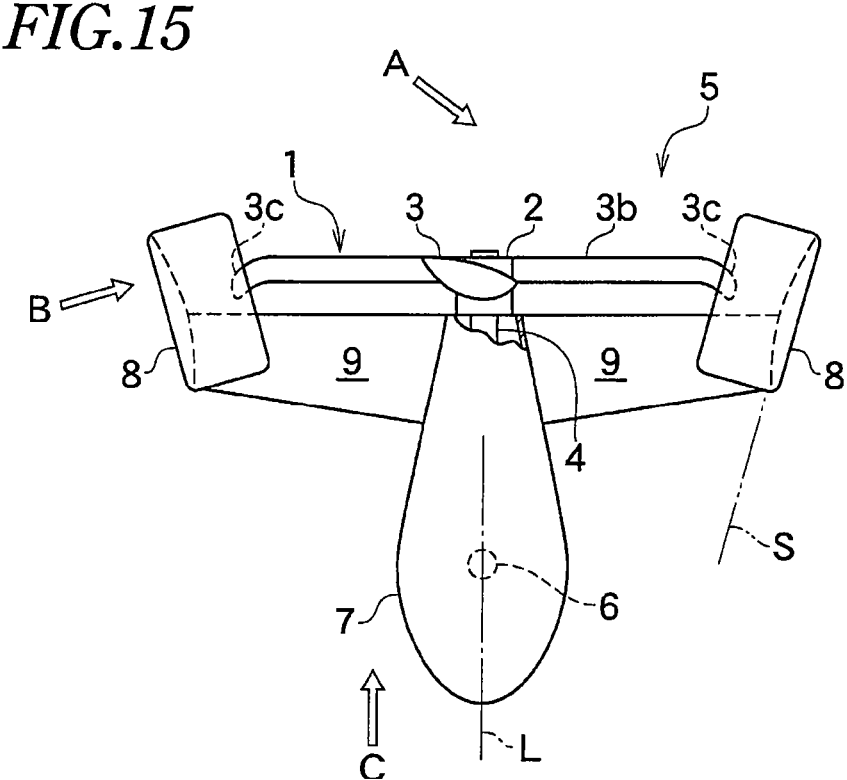
FIG. 15 is a plan view showing Embodiment 2 of the horizontal-axis wind turbine according to the present invention.
Figure 16:
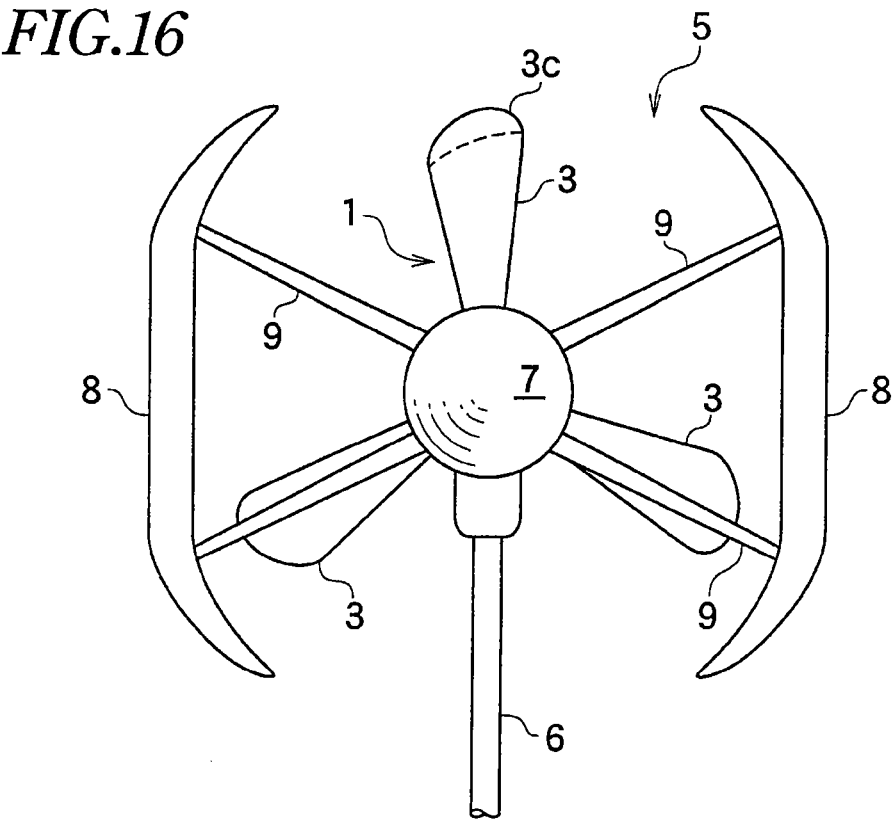
FIG. 16 is a front view showing the horizontal-axis wind turbine shown in FIG. 15.

FIG. 15 is a plan view showing Embodiment 3 of the horizontal-axis wind turbine, and FIG. 16 is a front view of the same. The same numerals are used to indicate parts that are the same as those previously described, and no further description of such parts will be given.

In the horizontal-axis wind turbine 5, a chassis 7 is mounted so as to be able to pivot at the top of a column 6. The center of pivoting about the column 6 is set in the chassis 7 as close as possible to a position that is 20% to 40% of the length of the chassis 7 from the distal end part of the chassis 7.

A generator (not shown) is disposed inside the chassis 7, the propeller shaft 4 connected to the generator is horizontally provided, and the rear part of the propeller shaft 4 protrudes outward to the back of the chassis 7. An accumulator, various types of sensors, an automatic control device, and other indispensable mechanical members (not shown) are housed inside the chassis 7. As shown in the drawing, the propeller 1 is attached to the propeller shaft 4. Although not shown in the drawing, a rear cover is fitted from behind the boss 2.

Three propeller vanes 3 are shown in the drawing, but this number is not limiting. The propeller vanes 3 are designed so that the chord length of the distal end parts is wider than the base parts. The chord length of the distal end parts is set to a range of 20% to 45% of the rotational diameter, for example.

The distal end parts of the propeller vanes 3 have a tilted part 3c formed therein that is tilted 30 degrees to 45 degrees forward.

Pairs of upper and lower support vanes 9 are provided to the left and right side parts of the front surface of the chassis 7 in radial fashion, and directional rudders 8 on the left and right are provided to the distal end parts of the support vanes 9, and are equally spaced from the chassis 7.

The support vanes 9 are designed so as to be narrower at the distal end parts than at the base in a plane, and when viewed from the front, the distal end parts have a smaller plate thickness than the base parts thereof. In cross-section, the front parts are thick and decrease in thickness towards the rear. In this case, the lower support vanes 9 are designed so as to protrude to a greater degree at the front of the upper surfaces than at the lower surfaces, and the upper support vanes 9 are designed so as to protrude to a greater degree at the front of the lower surfaces than at the upper surfaces. The flow of wind passing between the upper and lower support vanes 9 is thereby faster than the flow of wind passing over the upper and lower surfaces of the upper and lower support vanes 9.

The upper and lower parts of the directional rudders 8 are curved inward. This curve is designed to follow an arc at a prescribed distance so that the directional rudders 8 do not enter the rotational track of the distal end surfaces of the propeller vanes 3.

The directional rudders 8 are also designed so as to open outward so that the front-rear line (S) is angled 10 degrees to 17 degrees with respect to the longitudinal center line (L) of the chassis 7.

The propeller 1 does not rotate when the wind blows as indicated by arrow A in FIG. 15. However, since the wind indicated by the arrow A contacts and pushes on the directional rudders 8, the chassis 7 pivots about the column 6 as the pivot point, and the propeller 1 rotates, having thus been automatically positioned downwind.

In FIG. 15, the propeller 1 also does not rotate when the wind blows as indicated by arrow B. However, since the wind indicated by the arrow B contacts the directional rudders 8, the chassis 7 pivots about the column 6 as the pivot point, and the propeller 1 rotates, having thus been automatically positioned downwind. Since the directional rudders 8 open outward in this manner so that the front-rear line (S) is angled 10 degrees to 17 degrees with respect to the longitudinal center line (L) of the chassis 7, the directional rudders 8 respond with high sensitivity to wind coming from any direction.

In FIG. 15, when the wind indicated by the arrow C blows from the front, the wind indicated by the arrow C passes to the left and right of the directional rudders 8.

In this case, the wind that passes outside the left and right directional rudders 8 pushes on the outside rear parts of all of the directional rudders 8, but the left and right are well balanced, and the propeller 1 therefore faces the wind and rotates efficiently.

When there is even a slight change in wind direction, the strength of the left or right wind changes with respect to the directional rudders 8. Therefore, the balance is disrupted, the chassis 7 is pivoted by pressure from a strong wind, and the propeller 1 changes orientation so as to face the wind.

In FIG. 15, the wind escaping the space between the left and right directional rudders 8 is guided by the directional rudders 8, and passes through. In this case, although the entrance space between the opposing left and right directional rudders 8 is narrow, there is a widely opening exit, and the air stream is therefore dispersed at the inside rear part of the directional rudders 8 as the wind escapes to the rear, and the air density decreases.

The air stream is compressed at the outside rear part of the directional rudders 8. As a result, the air stream that passes through the inside of the directional rudders 8 is faster than the air stream outside. A large amount of this accelerated air stream makes contact exactly at the tilted part 3c of the propeller vane 3 and contributes to the rotational speed. When the air pressure decreases at the inside rear portion of the directional rudders 8, air streams from other positions rapidly enter the low-pressure area from above and below, the wind flow rate in a given time increases, and the rotational efficiency of the propeller 1 is increased.

When the propeller 1 is disposed at the rear part of the chassis 7, the propeller 1 is subjected to air resistance in the rotation direction on the front surface of the chassis 7 in conjunction with the rotation of the propeller 1, and the conventional chassis 7 pivots to the direction of low resistance. As a result, the chassis 7 pivots in reverse and sometimes points in the opposite direction from the wind.

However, in the present invention, since the rear parts of the left and right directional rudders 8 are tilted so as to open outward as previously described, the wind received from the front surfaces of the directional rudders 8 restricts pivoting from the left and right, and centrifugal force oscillation from rotation of the propeller 1 therefore does not cause the chassis 7 to pivot.

For example, when a directional rudder oriented in the longitudinal direction is provided to the rear part of the chassis 7, wind that blows directly from the side has a direction-changing effect, but the directional rudders 8 are maintained in their original position by the strong wind flow passing to the rear due to the rotational effect of the propeller when wind blows at an angle from the front, and the chassis 7 sometimes does not change direction. In this regard, the directional rudders 8 in the present invention react with high sensitivity even to minute changes in the direction of the wind, and cause the chassis 7 to pivot.

Figure 17:
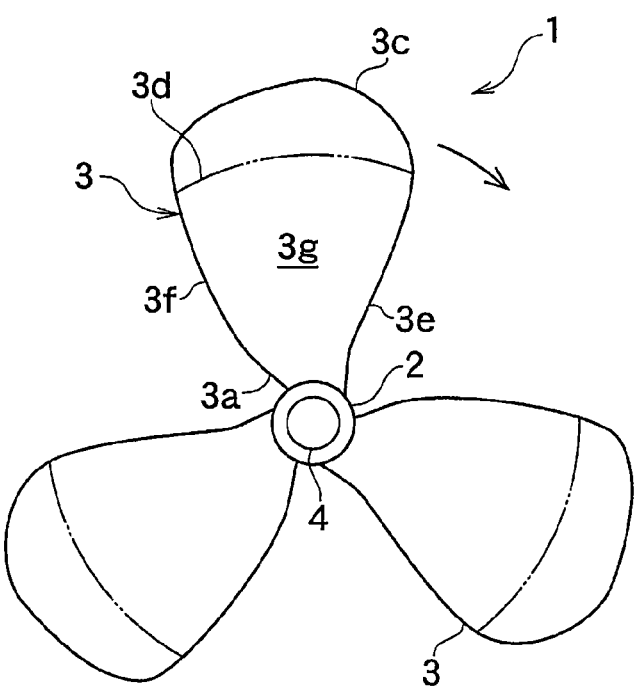
FIG. 17 is a front view showing the propeller according to Embodiment 4 of the present invention.

The propeller 1 shown in FIG. 17 is a marine propeller. A plurality (three in the drawing) of propeller vanes 3 is fixed to the boss 2, and the propeller rotates in the direction of the arrow. The base parts 3a of the propeller vanes 3 are narrow, and maximum chord length parts 3d are formed so that the chord length at the edge parts of the distal ends is increased to approximately 70% of the rotational radius.

As viewed from the side, the propeller vanes 3 are formed so that the plate thickness of the distal end parts is small, and tilted parts 3c are formed in which the distal end parts tilt in the downstream direction from the maximum chord length parts 3d. The tilt angle of the tilted parts 3c is 10 degrees to 30 degrees with respect to the axis center line (L) of the propeller shaft 4, but a tilt angle of 15 degrees to 20 degrees is preferred. However, the tilt angle of the tilted parts 3c may be set to 45 degrees according to the chord length. The proximal end parts of the tilted parts 3c are at the maximum chord length parts 3d, and the maximum chord length parts 3d are set in an arc on the rotational radius. Therefore, the resistance during rotation is low.

Figure 18:
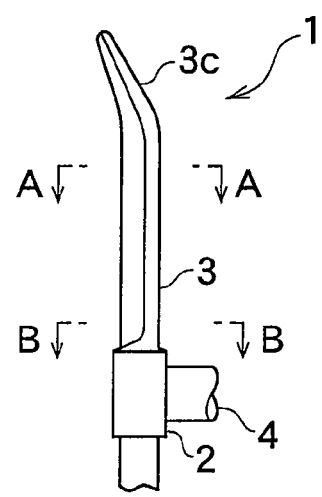
FIG. 18 is a side view showing one of the propeller vanes shown in FIG. 17.
Figure 19:
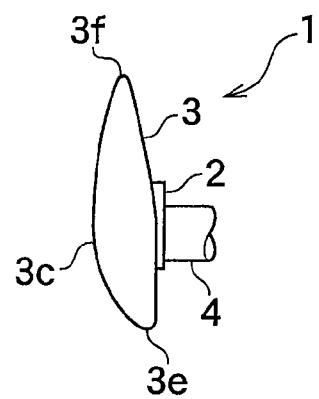
FIG. 19 is a plan view showing one of the propeller vanes shown in FIG. 17.
Figure 20:
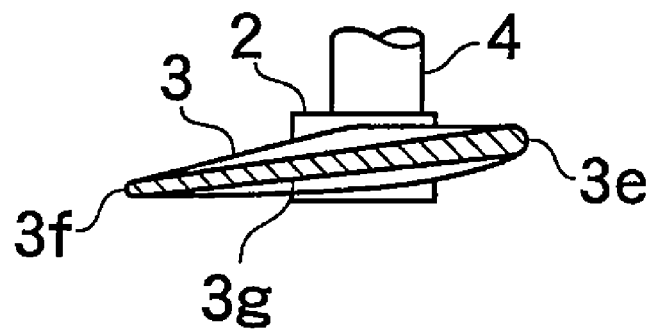
FIG. 20 is a sectional view taken along the line A-A in FIG. 18.
Figure 21:
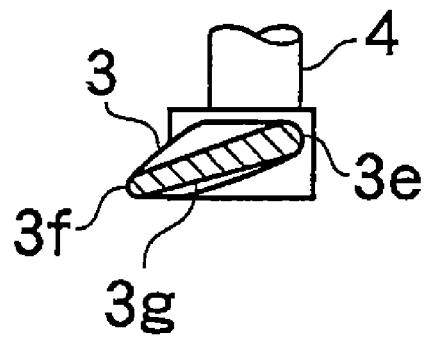
FIG. 21 is a sectional view taken along the line B-B in FIG. 18.

In the propeller vane 3 shown in FIGS. 18 and 19, the rotating leading side part 3e on the right of the discharge surface 3g is tilted upstream more than the rotating trailing side part 3f on the left, and the discharge surface 3g of the edge part of the distal end is tilted more gradually than the proximal end part of the propeller vane 3. The reason for this is that the upper and lower plate thicknesses are the same, the chord length of the base part is small, and the chord length of the edge part of the distal end is large.

Figure 22:
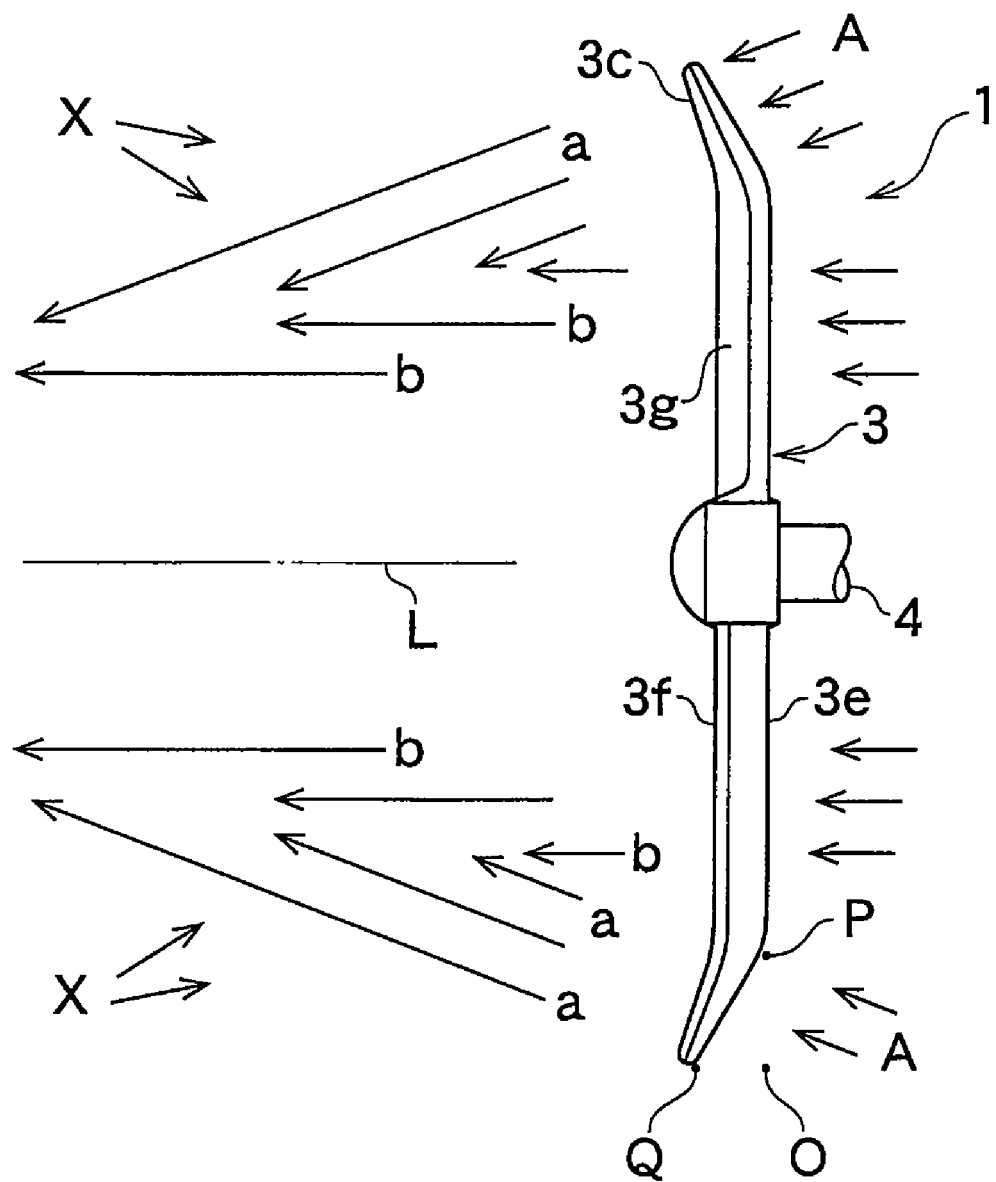
FIG. 22 is a side view used to describe the propeller.

When the propeller 1 configured as described above is rotated, the angled flows (a) pushed out by the tilted parts 3c are concentrated towards the axis center line (L) at the back, as shown in FIG. 22.

In FIG. 22, the closer to the distal end parts are the angled flows (a) pushed out by the tilted parts 3c, the faster these flows are pushed out with respect to the horizontal flows (b) pushed out by the vertical discharge surface 3g.

This process causes the angled flows (a) that merge at an angle with the horizontal flows (b) in FIG. 22 to apply fluid pressure to the horizontal flows (b) at an angle.

Consequently, when these propeller vanes 3 are used in a marine screw, the presence of water pressure indicated by the arrows X in FIG. 22 causes the horizontal flows (b) to push the propeller 1 in the opposite direction in reaction, and thrust is increased.

In FIG. 22, flows from outside the direction indicated by the arrow A are directly introduced because the tilted parts 3c are tilted, and the angled flows (a) apply additional fluid pressure to the horizontal flows (b) in an amount commensurate with PQ−OP=Y because the length from point P to point Q is longer than the length from point O to point P.

It is apparent from FIG. 17 that since the chord length of the tilted parts 3c is increased, and the tilted parts 3c are at the centrifugal parts and rotate at a higher speed than the portions near the output shaft 4, the high-speed angled flows (a) envelop the horizontal flows (b) in a substantial cone shape and correspond to a normal water pressure indicated by the arrow X. Therefore, the larger surface area of the conical side surface of the diameter circle of the propeller 1 with respect to the surface area of the diameter circle of the propeller 1 contributes to the thrust of the propeller 1.

What is claimed is:

1. A horizontal-axis wind turbine comprising:
   a column;
   a chassis rotatably mounted to the column;
   a propeller mounted to a back of the chassis and comprising a plurality of propeller vanes, each vane of the plurality of propeller vanes comprising a tilted part and a base part, a base part boundary line between the tilted part and the base part having a maximum chord length of each vane, the base part boundary line being an arc of a circle formed during rotation of the propeller;
   a plurality of support vanes mounted at a proximal end to the chassis and having distal ends; and
   a plurality of directional rudders mounted to the distal ends of the plurality of support vanes to surround the propeller.

* * * * *